United States Patent [19]
Momose

[11] Patent Number: 4,803,708
[45] Date of Patent: Feb. 7, 1989

[54] TIME-OF-DAY COINCIDENCE SYSTEM

[75] Inventor: Yuya Momose, Tokyo, Japan

[73] Assignee: NEC Corporation, Tokyo, Japan

[21] Appl. No.: 92,523

[22] Filed: Sep. 3, 1987

[30] Foreign Application Priority Data

Sep. 11, 1986 [JP] Japan ................... 61-214762

[51] Int. Cl.⁴ ............................................ G06F 11/00
[52] U.S. Cl. ...................................... 377/28; 371/61; 364/200
[58] Field of Search ..................... 377/28; 364/200; 371/61

[56] References Cited

U.S. PATENT DOCUMENTS

| | | | |
|---|---|---|---|
| 4,490,821 | 12/1984 | Lacher | 371/61 |
| 4,566,111 | 1/1986 | Tanagawa | 377/28 |
| 4,575,848 | 3/1986 | Moore et al. | 371/61 |
| 4,586,180 | 4/1986 | Anders et al. | 377/28 |

Primary Examiner—John S. Heyman
Attorney, Agent, or Firm—Foley & Lardner, Schwartz, Jeffery, Schwaab, Mack, Blumenthal & Evans

[57] ABSTRACT

A time of day coincidence system for coinciding time of day values of a plurality of apparatuses includes a clock pulse generator for generating clock pulses having a predetermined interval, a TOD time of day timer controlled by the clock pulse, a time of day correction signal generator for generating a correction signal in a predetermined interval which is a predetermined multiple of the count cycle of the TOD timer. The clock pulse generator, the TOD timer, and the time of day correction signal generator are arranged commonly for the apparatuses. The system also includes a counter, a count of which is incremented in response to the clock pulse, a time of day read and set unit for reading out current time of day information from the TOD timer in response to an external instruction and setting the time of day information in the counter, and a time of day correction unit for correcting the count of the counter in response to the correction signal in accordance with a predetermined rule. The counter, the time of day read and set unit, and the time of day correction unit are arranged in each of the apparatuses.

4 Claims, 6 Drawing Sheets

TIME-OF-DAY COINCIDENCE SYSTEM

BACKGROUND OF THE INVENTION

The present invention relates to a time-of-day coincidence system and, more particularly, to a system for coinciding time of day of a plurality of information processing apparatuses each having a time of day resetting, respectively function effected in response to common clock pulses.

In a system constituted by a plurality of information processing apparatuses, in order to control a processing sequence of the apparatuses and analyze processing results in accordance with the sequence order, a time of day resetting, respectively function is provided to each apparatus. Processing utilizing the contents of display performed by the time of day resetting, respectively function, or recording of displayed time of day values during execution of processing has been frequently performed.

In a system wherein a common data file is used in a plurality of information processing apparatuses in order to improve system reliability by means of redundancy or to realize load dispersion system, processing results of each information processing apparatus are recorded together with corresponding time of Day information during processing in a corresponding journal file. If a failure should occur, the contents of the journal files are combined with reference to time of day, respectively values, thereby restoring a normal system operation. In this case, if time of day, respectively values of the respective information processing apparatuses do not coincide with each other, the execution sequence of the common data file cannot be correctly established. The system may not be restored in the normal mode.

In order to solve the above problem, the time of day respectively values of the respective information processing apparatuses must coincide with each other so as not to adversely affect control and analysis.

A method of coinciding time of day values of the respective information processing apparatuses is to cause the plurality of information processing apparatuses to use a common TOD time of day (to be referred to hereinafter as a TOD) U.S. Pat. No. 4,388,688 (June 14, 1983) discloses a tightly coupled multi-processor in which a plurality of central processing units (CPU) commonly use a TOD timer arranged in a system controller and a time of day value is read out if time of day information is necessary. This method can be applied to a loosely coupled multi-processor. However, if there are variations in timing for reading out time of day information from the common time of day timer, TOD errors occur in the plurality of CPUs.

In order to shorten the TOD timer read access time, all bits of the time of day information can be output as parallel output bits. However, if the number of information processing apparatuses is increased, a large number of signal lines are undesirably required.

In the loosely coupled multi-processor, since a common TOD timer cannot be arranged in an interface for "tightly" connecting with all the processors, the time for executing a time of day read sequence is not negligible, and, accordingly, variations in time of day values of the respective information processing apparatuses are increased.

In addition, according to the above method, each information processing apparatus must read out time of day information whenever time of day information is needed, resulting in that, when the number of information processing apparatuses is increased, TOD timer read access requests are frequently generated. For this reason, lines and a control circuit for transfer of the readout data are complicated and expensive. If sufficient hardware for read access control and data transfer control is not provided, waiting time for read access requests is increased due to read contention, thereby degrading performance of each information processing apparatus.

In order to solvethe above problem, the following implementations are required:

(1) A counter which stores the latest time of day information is arranged in each information processing apparatus;

(2) The common TOD timer count must be set in each counter at the start of processing; and (3) The counts of the counters must be incremented so as not to cause a time lag between the information processing apparatuses.

With the above implementations, since the latest time of day information is present in each information processing apparatus, the common TOD timer need not be accessed whenever time of day information is needed. Therefore, even if the number of information processing apparatuses is increased, read contention does not frequently occur.

With the above implementations, in order to improve TOD coincidence precision, the following requirements must be satisfied:

(1) A set value in each counter has a minimum deviation from the value of the common TOD timer; and (2) Variations in counts of the counters in the respective information processing apparatuses must be minimized after the common initial value is set in each counter.

In order to satisfy requirement (1), hardware becomes bulky since time of day signal lines must be arranged to read out data from the common TOD timer and all bits of the time of day information are transferred as parallel output bits.

SUMMARY OF THE INVENTION

It is an object of the present invention to provide a time of day coincidence system capable of coinciding time of day values of the respective information processing apparatuses and requiring a small quantity of hardware.

According to the present invention, there is provided a time of day coincidence system for coinciding time of day value of a plurality of apparatuses, comprising: clock pulse generating means for generating clock pulses having a predetermined interval; TOD timer means controlled by the clock pulses; correction signal generating means for generating a correction signal in a predetermined interval which is a predetermined multiple of the count cycle of the TOD timer means, the clock pulse generating means, the TOD timer means, and the correction signal generating means being arranged commonly for the apparatuses; a counter, a count of which is incremented in response to the clock pulse; reading and setting means for reading out current time of day information from the TOD timer means in response to an external instruction and setting the time of day information in the counter; and correcting means for correcting the count of the counter in response to the correction signal in accordance with a predetermined rule, the counter, the reading and setting means, and the correcting means being arranged in each of the apparatuses.

BRIEF DESCRIPTION OF THE DRAWINGS

FIGS. 6(a) to 6(h) are timing charts for explaining the operation of the system shown in FIG. 1.

DETAILED DESCRIPTION OF THE PREFERRED EMBODIMENT

The present invention will be described with reference to the accompanying drawings.

Figure 1:
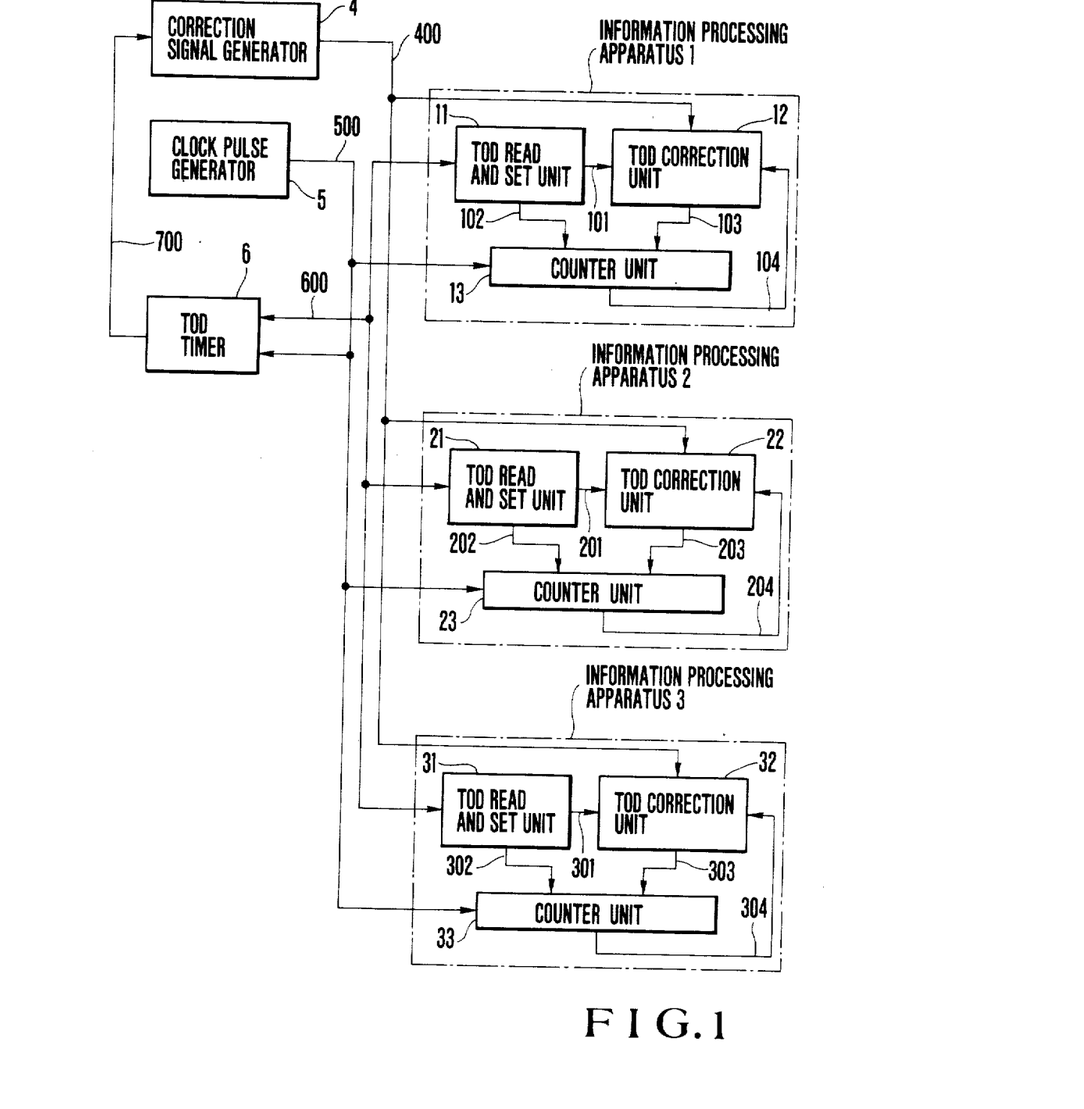
FIG. 1 is a block diagram showing a time of day coincidence system according to an embodiment of the present invention.

FIG. 1 is a block diagram showing a time of day coincidence apparatus according to an embodiment of the present invention.

Referring to FIG. 1, information processing apparatuses 1 to 3 comprise TOD clock counter units 13, 23, and 33, respectively. The counter units 13, 23, and 33 incorporate counters, the counts of which are incremented by one each whenever a clock pulse is commonly supplied from a clock pulse generator 5 through a signal line 500 thereto. Assume that the clock pulses constitute a pulse signal having a 1-sec interval. The counter units 13, 23, and 33 can be used as means for counting time in units of 1 μsec.

TOD read and set units 11, 21, and 31 in the information processing apparatuses 1, 2, and 3 read out time of day information from a common TOD timer 6 through a signal line 600. The time of day information can be set in the counter units 13, 23, and 33, respectively, through signal lines 102, 202, and 302. A TOD timer function in the TOD timer 6 is controlled in response to the clock pulses supplied from the clock signal generator 5 through the signal line 500.

A correction signal generator 4 is connected to the TOD timer 6 via a signal line 700. When a count of the TOD timer 6 reaches a predetermined value, the correction signal generator 4 generates a correction signal. The correction signal is supplied to TOD correction units 12, 22, and 32 in the information processing apparatuses 1, 2, and 3 through a signal line 400.

When the correction signal is received by the TOD correction units 12, 22, and 32, the current counts of the counter units 13, 23, and 33 are read out through signal lines 104, 204, and 304, respectively. Correction values corresponding to the readout counts are set in the counter units 13, 23, and 33 through signal lines 103, 203, and 303, respectively. A count correction technique is rounding to predetermined number of decimals of the counts of the counters incorporated in the counter units 13, 23, and 33.

Figure 2:
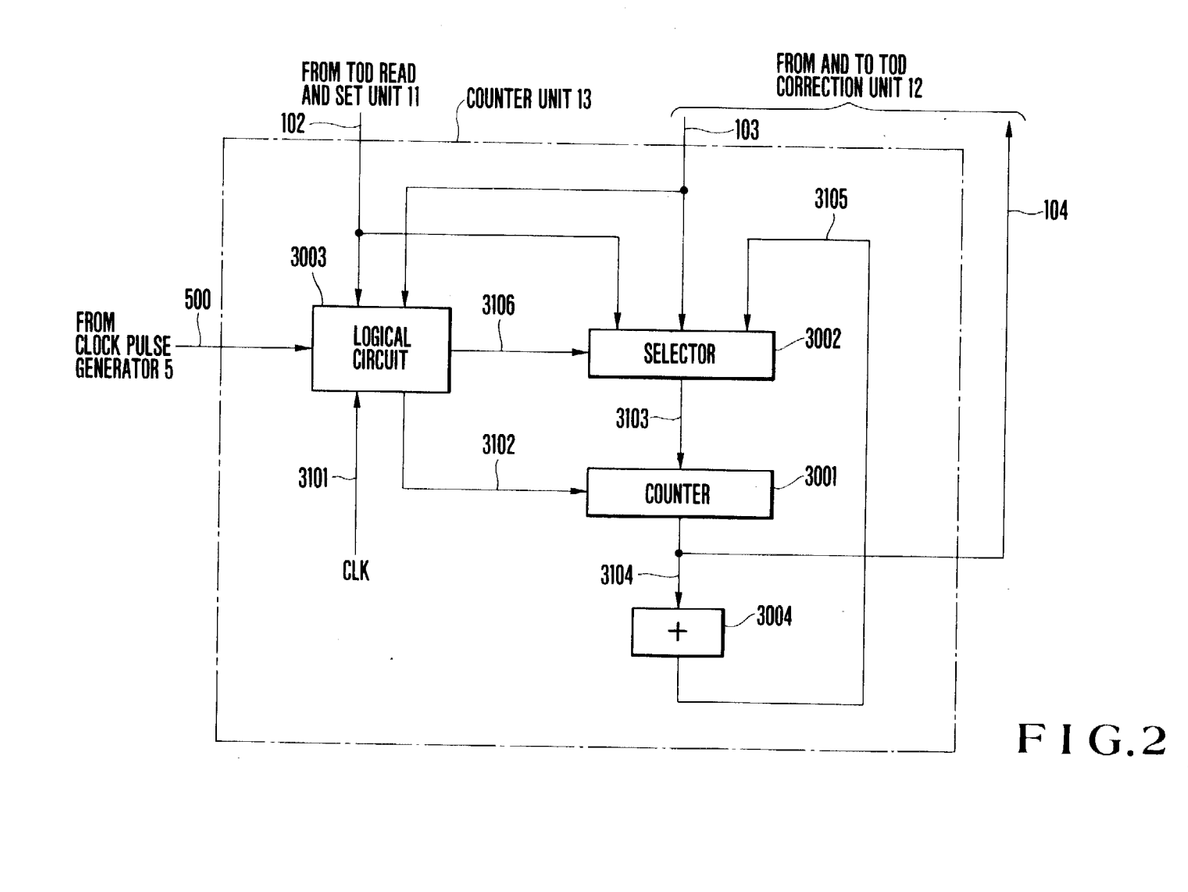
FIG. 2 is a block diagram of a counter unit shown in FIG. 1.

FIG. 2 is a block diagram of the counter unit 13 as a representative of the counter units 13, 23, and 33. The count of the counter 3001 is input to an adder 3004 through a signal line 3104. The count-up data from the adder 3004 is supplied to a selector 3002 through a signal line 3105. In the normal state, the selector 3002 is controlled by a signal line 3106 connected to a logical circuit 3003 to select the count-up data from the adder 3004. A clock signal CLK for controlling the counter 3001 is provided to the logical circuit 3003 through a signal line 3101. Usually, when the logical circuit 3003 receives the clock pulses through the signal line 500, the clock signal CLK is supplied from the logical circuit 3003 to the counter 3001 through a signal line 3102, thereby counting up the counter 3001.

Figure 3:
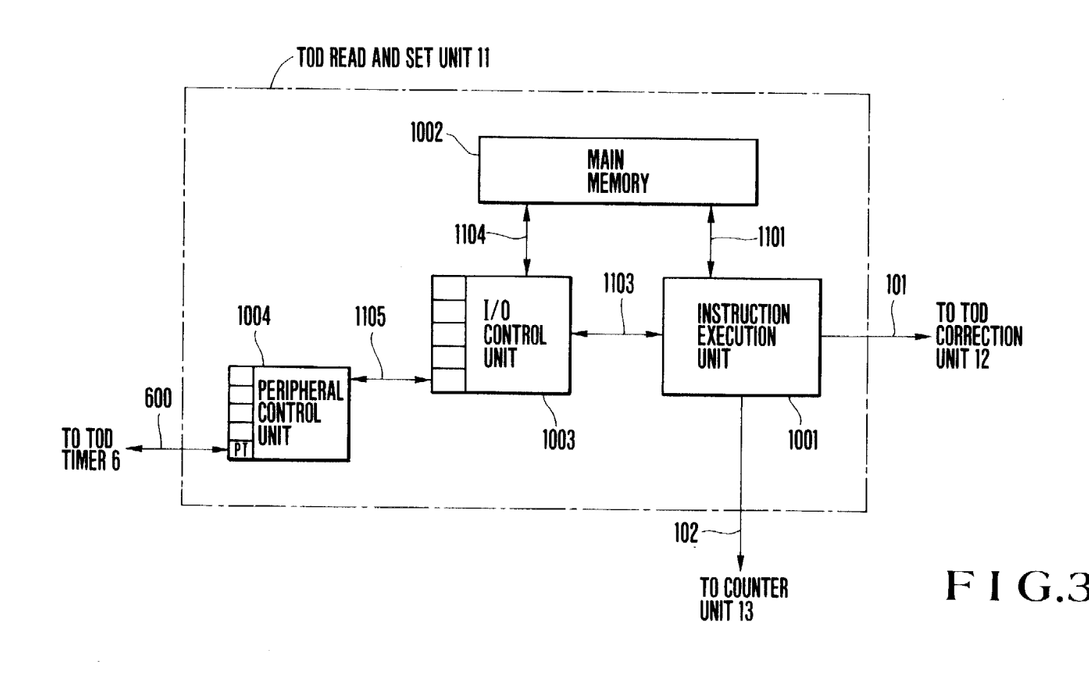
FIG. 3 is a block diagram of a time of day read and set unit shown in FIG. 1.

FIG. 3 is a block diagram of the time of day (TOD) read and set unit 11 as a representative of the TOD read and set units 11, 21, and 31. The TOD read and set unit 11 comprises an instruction execution unit 1001, a main memory 1002, an I/O control unit 1003, and a peripheral control unit 1004. The TOD read and set unit 11 controls the primary operations of the information processing apparatus 1. More specifically, in the TOD read and set unit 11, the main memory 1002 stores programs and data, the instruction execution unit 1001 decodes the instructions of the programs read out from the main memory 1002, data transfer between the main memory 1002 and various peripheral devices is performed through the I/O control unit 1004 and the peripheral control unit 1004 in accordance with an instruction. The function of the time of day read and set unit 11 in the TOD coincidence system according to the present invention is thus effected.

When read access of TOD information from the time of day timer 6 is required in response to a program instruction, the instruction execution unit 1001 supplies a control instruction for the I/O control unit 1003 to the main memory 1002 and initializes the I/O control unit 1003 through a signal line 1103.

The I/O control unit 1003 supplies a data transfer instruction to the peripheral control unit 1004 through a channel port connected to the peripheral control unit 1004 and selected from a plurality of channel ports in accordance with a control instruction stored in the main memory 1002. The peripheral control unit 1004 selects a port PT connected to the TOD timer 6, although there are a plurality of ports connected to various peripheral devices such as a line printer (not shown) and a card reader (not shown). Time of day data transfer is instructed through the signal line 600.

Figure 4:
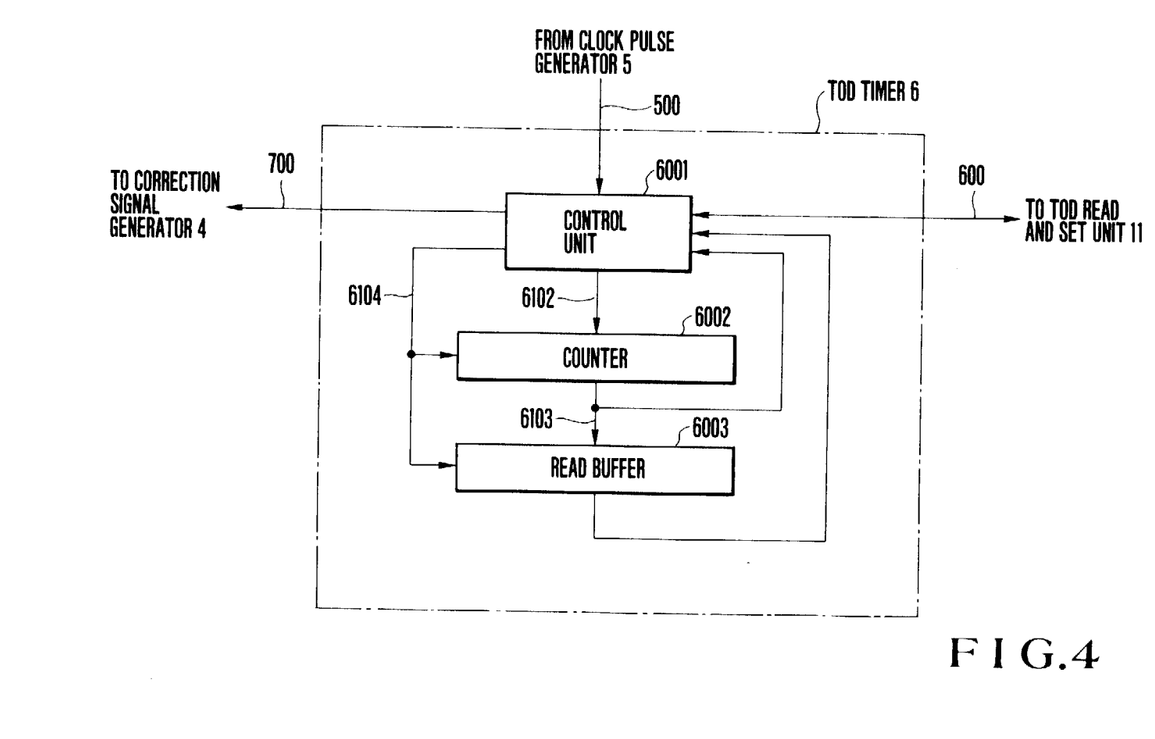
FIG. 4 is a block diagram of a TOD timer shown in FIG. 1.

FIG. 4 is a block diagram of the TOD timer 6. A counter 6002 stores current time of day information. This TOD information is updated through a signal line 6102 when a control unit 6001 receives the clock pulse from the clock pulse generator 5 through the signal line 500. When the control unit 6001 receives a TOD information transfer request from, e.g., the information processing apparatus 1 through the signal line 600, the control unit 6001 instructs to read out the count of the counter 6002. All bits of the readout count are completely transferred to a read buffer 6003. Thereafter, the contents of read buffer 6003 are read out by a plurality of times through the signal line 600. The read buffer 6003 is arranged due to the following reason. Even if time of day information in the counter 6002 is updated during transfer by the plurality of times, the readout information contents controlled not to contradict against the information values to be read out after time of day updating.

Since the signal line 600 is connected to the information processing apparatuses 1, 2, and 3, read request contention may occur. Contention control is performed by the control unit 6001. Each read request from one of the information processing apparatuses 1, 2, and 3 can be satisfied at a time. Read requests from the information processing apparatuses 2 and 3 must be waited until service to the information processing apparatus 1 is completed.

The TOD information thus sent through the signal line 600 is written in the main memory 1002 through the peripheral and I/O control units 1004 and 1003 in the TOD read and set unit 11 shown in FIG. 3. When write access is completed, the I/O control unit 1003 sends an interrupt signal to the instruction execution unit 1001 through the signal line 1103. When the instruction execution unit 1001 receives an interrupt signal during execution of an instruction, the instruction execution unit 1001 determines whether the end of processing is that of an I/O control instruction. If the I/O control instruction represents the end of time of day read access, the instruction execution unit 1001 reads out time of day data from the main memory 1002 and sends the readout time of day data together with a control signal onto the signal line 102. The control signal is sent to the logical circuit 3003 in the counter unit 13 shown in FIG. 2, and the readout time of day data is sent to the selector 3002. The logical circuit 3003 controls the counter 3001 through the signal lines 3106 and 3102 so as to cause the time of day data input to the selector 3002 to set in the counter 3001 through the signal line 102.

As previously described, in the normal state, the count of the counter 3001 is incremented whenever the clock pulse is input thereto through the signal line 500. Since the clock pulse is commonly supplied to the information processing apparatuses 1, 2, and 3 and the TOD timer 6 through the signal line 500, variations in time of day data in the respective apparatuses cannot logically occur once the time of day data is set in the counter 3001. However, since the I/O and peripheral control units 1003 and 1004 process data inputs/outputs with peripheral devices other than the TOD timer 6, it takes a given period of time to read out the time of day data from the time of day timer 6 and set it in the counter unit 13 due to contention of the above operations and a priority order of operations in the instruction execution unit. In this case, the given period of time also varies. If the period of time required for reading out the time of day data from the TOD timer 6 and setting it in the counter units 13, 23, and 33 is shorter than a clock pulse interval, the counts of the counters 13, 23, and 33 are equal to each other upon setting of the time of day data therein. However, if the time required for setting the time of day data varies within the range of 5 $\mu$sec and 90 $\mu$sec with respect to the 1 $\mu$sec clock pulse interval, a time difference having a maximum of 90 $\mu$sec occurs in the counts of the counters 13, 23, and 33 upon setting of the time of day data therein.

Figure 5:
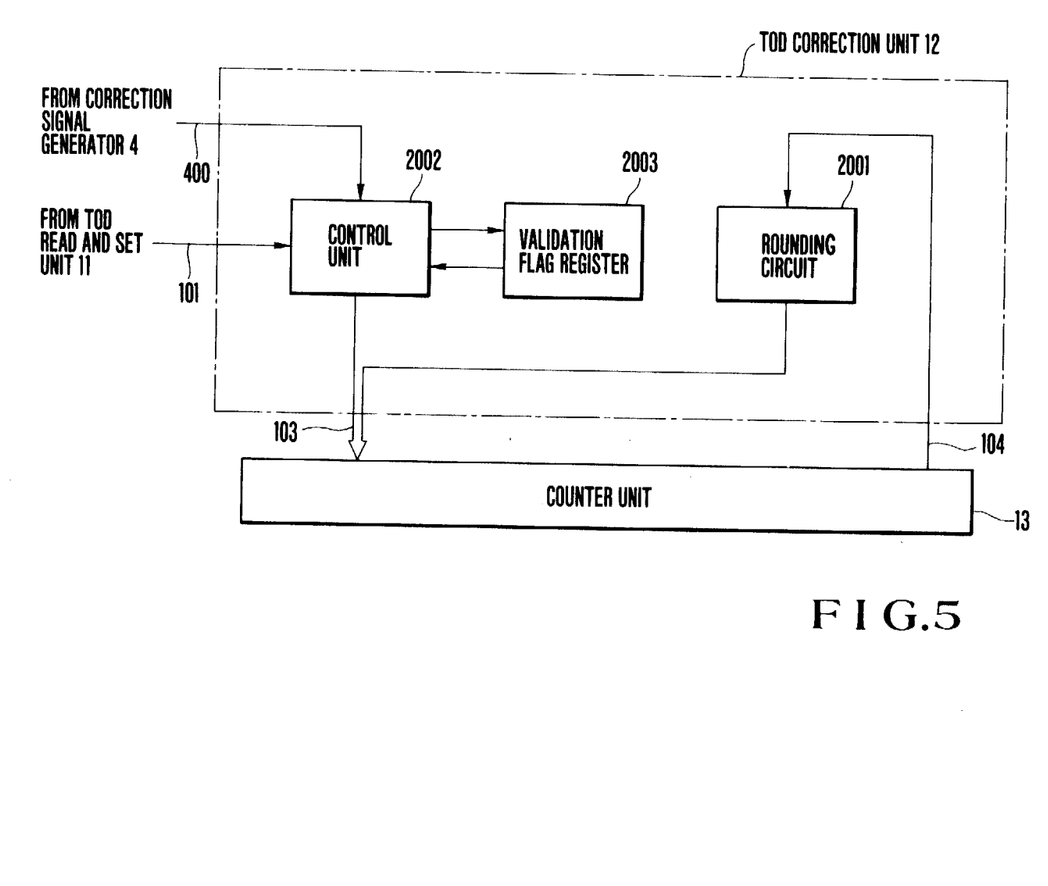
FIG. 5 is a block diagram of a time of day correction unit shown in FIG. 1.

FIG. 5 is a block diagram of the TOD correction unit 12. The count of the counter 3001 in the counter unit 13 shown in FIG. 2 is sent to a rounding circuit 2001 through the signal line 104. When the correction signal is supplied to a control unit 2002 through the signal line 400, the control unit 2002 checks the contents of a validation flag register 2003. If the validation flag is not set to logical "1", output data from the rounding circuit 2001 and the correction signal are sent to the counter unit 13 through the signal line 103. In this case, the control unit 2002 sets the validation flag register 2003.

It should be noted that the validation flag register 2003 is reset when the system is reset or a signal representing the end of time of day setting is sent through the signal line 101.

The rounded data of the signals sent onto the signal line 103 is supplied to the selector 3002 shown in FIG. 2, and the correction signal is sent to the logical circuit 3003. The same control as described above is performed, and the rounded data is set in the counter 3001.

Processing of the correction request signal has a higher priority over that of signals sent through the signal lines 500 and 102.

FIGS. 6(a) to 6(h) are timing charts for explaining the operation of the time of day coincidence system having circuit arrangements shown in FIGS. 1 to 5.

Figure 6:
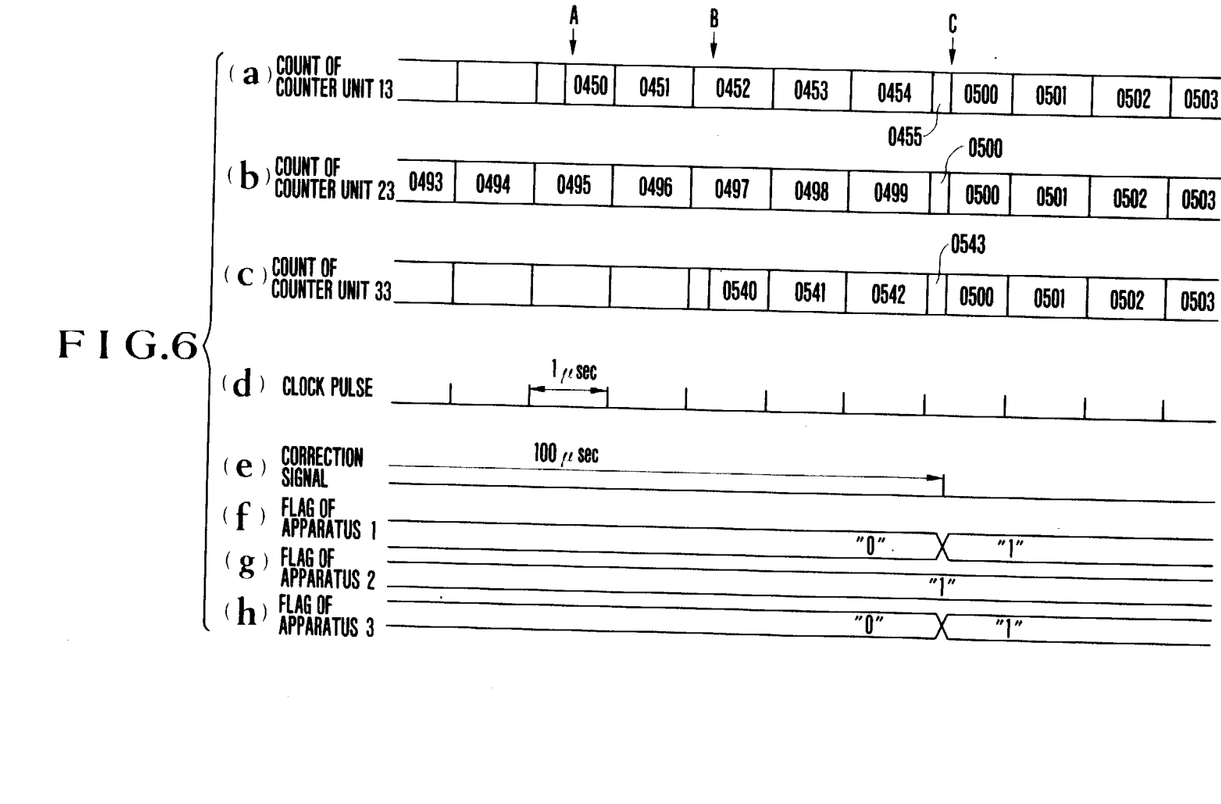

A pulse interval of the clock pulses is set to be 1 $\mu$sec in FIG. 6(d). The correction signal (FIG. 6(e)) is 100-$\mu$sec pulse signal whenever the time of day value of the time of day timer 6 reaches a multiple of 100 $\mu$s plus 45 $\mu$s. A maximum value caused by variations in read access is set to 90 $\mu$sec. The correction operation, i.e., rounding-up, is performed in units of 100 $\mu$sec. Under these conditions, counts of the counter units 13, 23, and 33 in the information processing apparatuses 1, 2, and 3 as a function of time are shown in FIGS. 6(a), 6(b), and 6(c), respectively.

In this embodiment, the TOD value has been set in the counter unit 23 in the information processing apparatus 2. The digit at the unit's place is updated in units of 1 $\mu$sec when the clock pulses are input at 0493 $\mu$sec, 494 $\mu$sec, ... The initial blank time slots of the counts in the counter units 13 and 33 indicate that no TOD values are set. At a timing A, the current TOD value is set in the counter unit 13 by the TOD read and set unit 11 in the information processing apparatus 1. At a timing B, the current time of day value is set in the counter unit 33 by the TOD read and set unit 31. The counts at the timing B do not coincide with each other due to variations. In this case, the variations are measured to be 90 $\mu$sec.

A timing C is given when the counter correction signal is supplied to each information processing apparatus since the time of day value is a multiple of 100 $\mu$sec plus 45 $\mu$sec. At this moment, the counts of the counters in the information processing apparatuses 1, 2, and 3 are rounded up. More specifically, 0455 $\mu$sec is rounded to 0500 $\mu$sec in the information processing apparatus 1; 0543 $\mu$sec is rounded to 0500 $\mu$sec in the information processing apparatus 3. Therefore, the counts of the counters in the counter units 13, 23, and 33 are equal to each other. The counter units 13, 23, and 33 are incremented by the common clock pulses and always have identical values.

The counters in the information processing apparatuses 1 to 3 are effectively used after the timing C. Validation/invalidation states of the counts of the counters are represented by the validation flags 14, 24, and 34 arranged in the TOD correction units 12, 22, and 32, respectively.

The above-mentioned rounding-up correction is considered. In principle, if an interval of the time of day correction signals is given as x seconds, a time of day coincidence is assured upon setting of the validation flags in systems in which variations in time of day fall within the range of x seconds. In this case, if the variations falling within the range of x seconds are assured, precision (the number of digits) of the time of day value sent from the time of day timer 6 to the counter units 13, 23, and 33 in the information processing apparatuses 1, 2, and 3 can be less accurate than that (the interval of the clock pulses) of the counters.

The above description exemplifies a particular embodiment, and the present invention is not limited thereto. For example, in the above embodiment, the number of counter built-in apparatuses is three. However, the number of apparatuses is not limited to three, but can be two or more.

Only one TOD timer 6 is arranged in the system shown in FIG. 1. However, the present invention is applicable to a case wherein a plurality of TOD timers having the range of errors falling within a predetermined range are used, and each information apparatus receives time of day information from any one of the TOD timers.

The correction scheme employs rounding in the above embodiment. However, by properly determining a timing for generating a correction signal and timings for reading out and setting the time of day information in consideration of variations, other correction schemes, for example, omission may be employed.

According to the present invention as described above, variations in reading and setting of TOD information are corrected by the correction signal, and TOD coincidence precision can be improved independently of reading and setting of TOD information. Data read signal lines for reducing variations in reading and setting of TOD information need not be arranged. In addition, signal lines for transferring parallel TOD data constituted by a large number bits need not be arranged. Therefore, the high-precision TOD coincidence can be achieved using a small quantity of hardware.

What is claimed is:

1. A time of day coincidence system for coinciding time of day values of a plurality of apparatuses, comprising:

clock pulse generating means for generating clock pulses having a predetermined interval;

TOD timer means controlled by the clock pulses;

correction signal generating means for generating a correction signal in a predetermined interval which is a predetermined multiple of the count cycle of said TOD timer means;

said clock pulse generating means, said TOD timer means, and said correction signal generating means being arranged commonly for said apparatuses;

a counter, a count of which is incremented in response to the clock pulse;

reading and setting means for reading out current time of day information from said TOD timer means in response to an external instruction and setting the time of day information in said counter; and correcting means for correcting the count of said counter in response to the correction signal in accordance with a predetermined rule, said counter, said reading and setting means, and said correcting means being arranged in each of said apparatuses.

2. A system according to claim 1, wherein said correcting means has a correction identification flag representing that the count of said counter has corrected.

3. A system according to claim 1 or 2, wherein if the interval of the time of day correction signal is defined as x seconds, variations in time of dayreading and setting operation performed by said reading and setting means are less than x seconds.

4. A system according to claim 2, wherein if the interval of the time of day correction signal is defined as x seconds,. variations in time of day reading and setting operation performed by said reading and setting means are less than x seconds.

* * * * *